United States Patent Office 2,729,668
Patented Jan. 3, 1956

2,729,668
PROCESS FOR MAKING DIETHOXYPHOSPHORYL TETRAMETHYLDIAMIDOTHIOPHOSPHATE

George A. Saul, Nitro, W. Va., assignor to Monsanto Chemical Company, St. Louis, Mo., a corporation of Delaware No Drawing. Application May 3, 1954,
Serial No. 427,351

1 Claim. (Cl. 260—461)

This invention relates to diethoxyphosphoryl tetramethyldiamidothiophosphate believed to be a new chemical compound of the structure

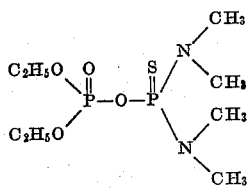

In co-pending application Serial No. 256,365, filed November 14, 1951, is described a method for preparing unsym. dialkyl bis(dialkylamido)pyrophosphates comprising heating together substantially equimolecular proportions of diethyl chlorophosphate and the methyl or ethyl ester of bis(dimethylamido)phosphoric acid.

In accordance with the present invention it has been found that the methyl or ethyl ester of bis(dimethylamido)thiophosphoric acid react similarly to produce the aforesaid new compound.

The following is illustrative of the invention:

Into a 500 cc. flask equipped with stirrer, thermometer, and reflux condenser topped with calcium chloride tube were charged substantially 38.6 parts by weight (0.197 mole) ethyl bis(dimethylamido)thiophosphate and substantially 34.0 parts by weight (0.197 mole) of diethyl chlorophosphate. The mixture was then heated to 120–125° C. and held at that temperature with stirring for 4½ hours, at which time the weight loss was 8.4 parts by weight. After standing overnight, the mixture was again heated for 3 hours under line vacuum and then under pump vacuum. At this time the total weight loss was 11.8 parts by weight. The mixture was again heated for a 1 hour period during which time the temperature was maintained at about 120° C. under full pump vacuum. After this last heat treatment the weight loss amounted to 12.8 parts by weight, the theoretical weight loss for this reaction. The product, a yellow liquid, was filtered through Attapulgus clay to clarify. It analyzed as follows:

| | Found | Theory |
|---|---|---|
| Phosphorus | 20.4 | 20.4 |
| Sulfur | 9.7 | 10.5 |
| Nitrogen | 8.9 | 9.2 |
| $n_D^{25}$ | 1.4761 | |

The intermediate, ethyl bis(dimethylamido)thiophosphate, was prepared by reacting bis(dimethylamido)chlorothiophosphate with ethyl alcohol and pyridine using benzene as a solvent. The product was a clear, colorless distillate obtained in 82.2% yield. Analysis of the product gave

| | Found | Theory |
|---|---|---|
| Phosphorus | 15.8 | 15.8 |
| Sulfur | 16.0 | 16.3 |
| Nitrogen | 13.4 | 14.25 |
| $n_D^{25}$ | 1.4812 | |

In turn, bis(dimethylamido)chlorothiophosphate was prepared by reacting thiophosphoryl chloride with dimethyl amine in heptane as a solvent at a temperature less than 30° C. The product after filtration to remove traces of solids gave the following analysis:

| | Found | Theory |
|---|---|---|
| Chlorine | 19.8 | 19.0 |
| Phosphorus | 16.0 | 16.6 |
| Sulfur | 16.8 | 17.1 |

The new compound is a potent insecticide. For example, diethoxyphosphoryl tetramethyldiamidothiphosphate gave 100% kill when evaluated by the residue sprayed Petri dish test. Petri dishes were sprayed with an acetone solution of the test material using approximately 20 ml. for each spraying. The open dishes were held for 24 hours, then the insects were placed on the dishes and held uncovered for 48 hours at room temperature without food or water. The results are set forth in Table I.

Table I

| Organism | Percent Kill at Concentration of— | |
|---|---|---|
| | 1.0% | 0.1% |
| Milkweed Bug | 100 | 100 |
| Tribolium | 100 | 100 |
| Carpet Beetle Larvae | 100 | |

Similarly, complete kill with diethoxyphosphoryl tetramethyldiamidothiophosphate was obtained when used as a systemic insecticide. Bean plants in the second leaf stage were cut and placed in 10 p. p. m. solutions of the new compound for three days. The plants were then transferred to water and the organisms transferred to the plants. The toxic effect of the diethoxyphosphoryl tetramethyldiamidothiophosphate on insects feeding on such plants is shown in Table II.

Table II

| Insect | Percent Kill at Concentration of— | |
|---|---|---|
| | 0.001% | 0.0007% |
| Southern Army Worm | 100 | 40 |
| Two-spotted Mite | 100 | 100 |
| Mexican Bean Beetle Larvae | 100 | |

Application as a foliage spray was likewise effective. An aqueous spray of diethoxyphosphoryl tetramethyldiamidothiophosphate was applied to potted plants, some of which were infested with insects and some to which insects were later transferred. Both surfaces of the foliage were sprayed to run-off. After three days the kill of the two-spotted mite was 100% at dilutions of 0.1%, 0.05% and 0.25%. The effectiveness of this compound against leaf chewing insects is noteworthy. Unsym. diethyl tetramethyldiamidopyrophosphate and diethoxythiophosphoryl tetramethyldiamidophosphate are inactive against these organisms.

Insecticidal properties are retained by compounds in which the ethyl and methyl substituents are replaced by other short chain alkyl groups notably of 1–4 carbon atoms.

It is intended to cover all changes and modifications of the examples of the invention herein chosen for purposes of disclosure which do not constitute departures from the spirit and scope of the invention.

What is claimed is:

The method of making diethoxyphosphoryl tetramethyldiamidothiophosphate which comprises heating together substantially equimolecular proportions of diethoxyphosphoryl chloride and a short chain alkyl ester of bis(dimethylamido)thiophosphate.

References Cited in the file of this patent

UNITED STATES PATENTS 2,567,154     Kosolapoff _____ Sept. 4, 1951

OTHER REFERENCES

B. I. O. S. Report 714 P. B. 87923 R, page 25 (1948).